United States Patent
Buuck et al.

(10) Patent No.: US 9,976,452 B1
(45) Date of Patent: May 22, 2018

(54) RECIPROCATING CYLINDER LINER SEAL ASSEMBLY

(71) Applicant: Dana Automotive Systems Group, LLC, Maumee, OH (US)

(72) Inventors: Glenn Buuck, Auburn, IN (US); Thomas G. Heller, Seattle, WA (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days. days.

(21) Appl. No.: 15/339,802

(22) Filed: Oct. 31, 2016

(51) Int. Cl.
  *F01L 7/02* (2006.01)
  *F01L 5/24* (2006.01)
  *F02F 11/00* (2006.01)
  *F01L 5/04* (2006.01)
  *F01L 5/16* (2006.01)
  *F01L 7/16* (2006.01)
  *F01L 5/12* (2006.01)

(52) U.S. Cl.
  CPC ............ *F01L 5/24* (2013.01); *F01L 5/04* (2013.01); *F01L 5/16* (2013.01); *F02F 11/005* (2013.01); *F01L 5/12* (2013.01); *F01L 7/02* (2013.01); *F01L 7/16* (2013.01); *F01L 2810/02* (2013.01)

(58) Field of Classification Search
  CPC ....... F01L 7/02; F01L 7/16; F01L 5/04; F01L 5/24; F01L 5/12
  See application file for complete search history.

(56) References Cited

U.S. PATENT DOCUMENTS

| | | |
|---|---|---|
| 4,141,562 A | 2/1979 | Wu |
| 4,171,818 A | 10/1979 | Moskowitz et al. |
| 4,426,094 A | 1/1984 | Antonini |
| 4,504,068 A | 3/1985 | Holzer |
| RE33,715 E | 10/1991 | Miura |
| 5,163,692 A | 11/1992 | Schofield et al. |
| 5,237,971 A | 8/1993 | Worsley |
| 5,368,312 A | 11/1994 | Voit et al. |
| 5,884,919 A | 3/1999 | Saito |
| 6,367,811 B1 | 4/2002 | Hosokawa et al. |
| 6,764,079 B1 | 7/2004 | Hegemier et al. |
| 7,025,030 B2 | 4/2006 | Leimer |
| 7,914,209 B2 | 3/2011 | Yamamoto et al. |
| 8,544,445 B2 | 10/2013 | Cleeves et al. |
| 8,602,419 B2 | 12/2013 | Namuduri et al. |
| 8,904,998 B2 | 12/2014 | Cleeves |
| 9,016,255 B2 | 4/2015 | Cleeves et al. |
| 9,052,018 B2 | 6/2015 | Hegemier et al. |
| 9,284,863 B2 | 3/2016 | Kurth et al. |

(Continued)

*Primary Examiner* — Jacob Amick
*Assistant Examiner* — Charles Brauch
(74) *Attorney, Agent, or Firm* — Marshall & Melhorn, LLC

(57) ABSTRACT

A reciprocating cylinder seal assembly has an elastomeric seal with a radially inwardly directed oil sealing lip and a radially inwardly directed gas sealing lip, wherein both lips are in elastomeric-to-metal sealing contact with a reciprocating engine liner. The assembly further has a U-shaped seal retainer that is attached to the elastomeric seal, where the U-shaped seal retainer is placed in direct intimate contact with a cylindrical engine housing. The U-shaped seal retainer and a reciprocating engine housing may be separated by and be in contact with a major portion of a J-shaped gas shield with a hook portion that is located between the oil sealing lip and a manifold port, where the hook portion of the J-shaped gas shield has a metal backer ring embedded in it.

13 Claims, 4 Drawing Sheets

(56) References Cited

U.S. PATENT DOCUMENTS

| | | |
|---|---|---|
| 2009/0230630 A1 | 9/2009 | Kondo et al. |
| 2011/0197756 A1 | 8/2011 | Hold et al. |
| 2012/0126490 A1* | 5/2012 | Maskaliunas ............ F16J 15/48 |
| | | 277/572 |
| 2012/0291744 A1* | 11/2012 | Elsbett ...................... F01L 5/06 |
| | | 123/193.2 |
| 2015/0192205 A1 | 7/2015 | Oiyama et al. |
| 2015/0240949 A1 | 8/2015 | Tones et al. |

* cited by examiner

US 9,976,452 B1

RECIPROCATING CYLINDER LINER SEAL ASSEMBLY

FIELD OF THE DEVICE

The present device relates to an engine valve seal assembly. More particularly, the present device relates to an engine cylinder liner seal assembly used in a reciprocating cylinder engine.

BACKGROUND OF THE DEVICE

For a vehicle with a reciprocating cylinder engine, a valve seal assembly cooperates with an engine reciprocating engine to provide lubrication, while containing engine gases within engine inlet and exhaust ports. To accomplish these functions, the valve seal assembly may include an engine elastomeric seal that is in an elastomeric-to-metal seal between the engine elastomeric seal and an engine reciprocating shaft. An example of this kind of a valve seal assembly is a Dana Corporation AllBond™ assembly, where a retainer is fitted around a valve guide.

Unfortunately, current valve seal assemblies and methods in use with existing reciprocating cylinder engines that have a reciprocating liner (aka, sleeve) experience significant radial run out. As a result, such engines eventually allow oil to escape into engine inlet and exhaust ports. Consequently, such engines operate poorly, generate pollutants, and their lifespans are shortened. Hence, what is sought is an engine reciprocating cylinder liner seal assembly that better controls radial run out associated with its reciprocating mechanisms, thereby better containing oil with its valve seals over an engine lifetime. Such a reciprocating cylinder liner engine would operate better, produce less pollutants, and experience an extended life span.

SUMMARY

An engine reciprocating cylinder liner seal assembly has an elastomeric seal with a radially inwardly directed oil sealing lip and a radially inwardly directed gas sealing lip, which are in contact with a reciprocating engine liner. The elastomeric seal is attached to a U-shaped seal retainer, which is in intimate contact with a cylindrical engine housing.

Further objects and advantages will be apparent from the following description and appended claims, reference being made to the accompanying drawings forming a part of a specification, wherein like reference characters designate corresponding parts of several views.

DESCRIPTION OF THE PREFERRED EMBODIMENT

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
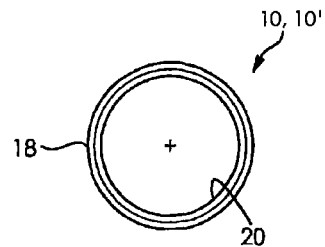
FIG. 1 is an axial view of two engine reciprocating cylinder liner seal assemblies.
Figure 2:
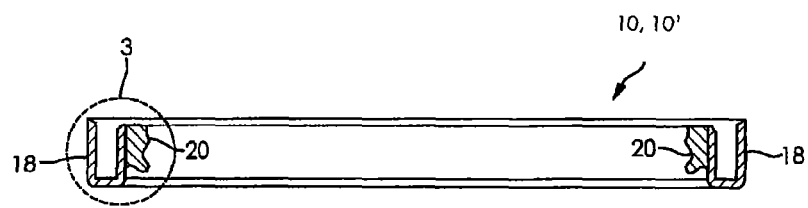
FIG. 2 is a cross sectional plan view of the engine reciprocating cylinder liner seal assemblies of FIG. 1.
Figure 4:
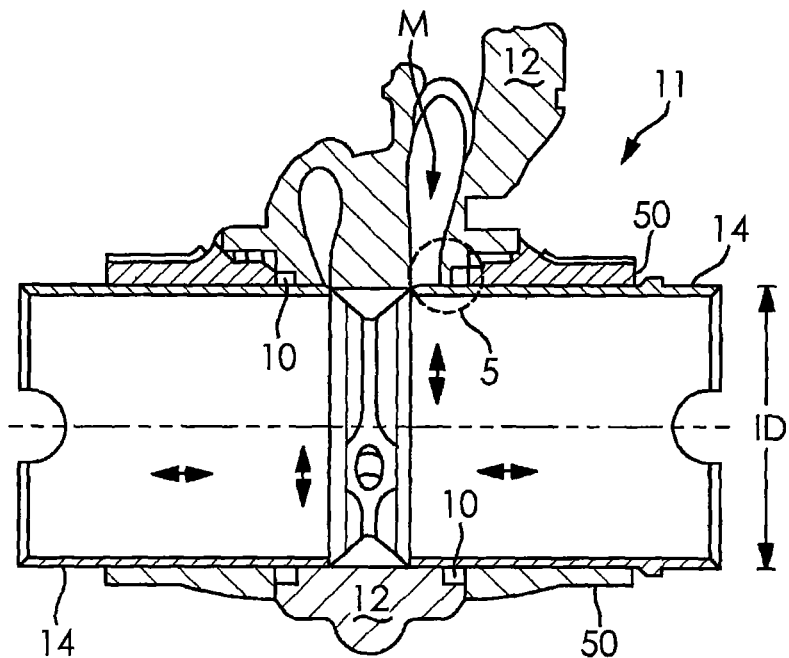
FIG. 4 is a cross sectional view of a portion of a first engine reciprocating cylinder liner engine.
Figure 6:
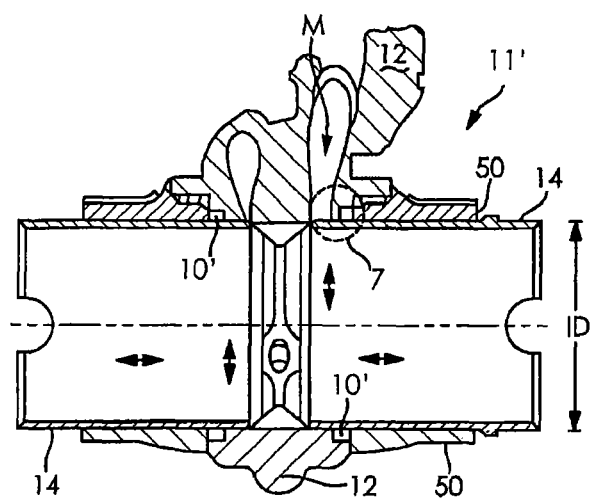
FIG. 6 is a cross sectional view of a portion of a second engine reciprocating cylinder liner engine.

FIG. 1 depicts an axial view of an engine reciprocating cylinder liner seal assemblies 10, 10'. FIGS. 4 and 6 respectively illustrate a portion of reciprocating cylinder liner engines 11, 11', each having a cylindrical engine housing 12 where a reciprocating engine liner 14 is in sliding contact with the cylindrical engine housing 12 at the ID of the cylindrical engine housing 12. In both FIGS. 4 and 6, the two reciprocating cylinder seal assemblies 10, 10' are located radially outwardly from the reciprocating engine liner 14 and are in an elastomeric-to-metal sealing contact with the reciprocating engine liner 14.

Figure 5:
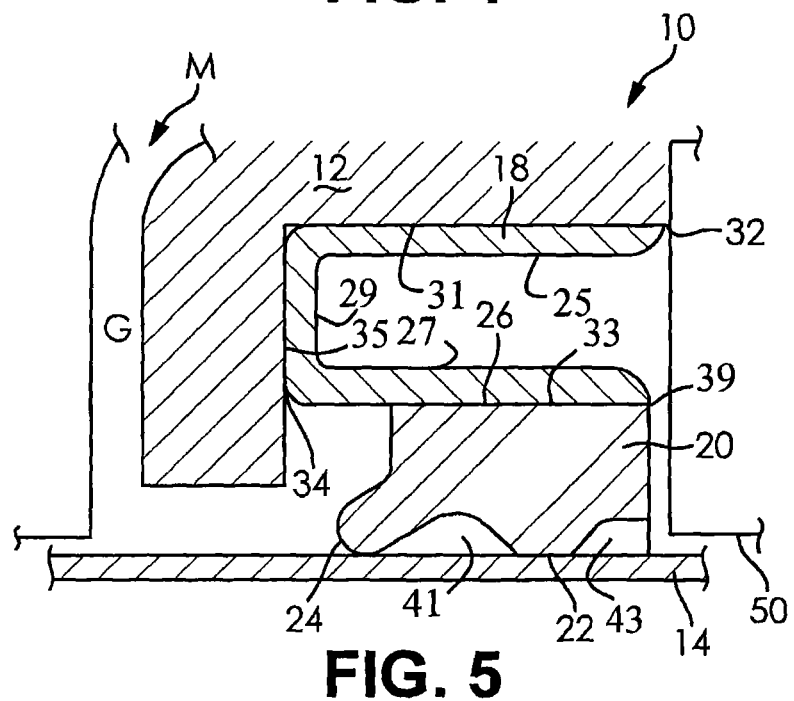
FIG. 5 is a cross sectional inset view of circled area 5 of FIG. 4.

In the first reciprocating cylinder seal assembly 10, FIG. 5 illustrates one of the reciprocating cylinder seal assemblies 10 where reciprocating motion associated with the reciprocating engine liner 14 is illustrated in FIG. 4 by two sets of double headed axially directed arrows within the ID of the cylindrical engine housing 12.

Figure 7:
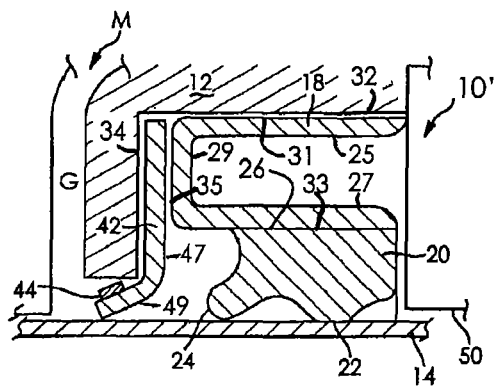
FIG. 7 is a cross sectional inset view of circled area 7 of FIG. 6 with a gas shield.

In the second reciprocating cylinder seal assembly 10', FIG. 7 illustrates one of these reciprocating cylinder seal assemblies 10' where reciprocating motion associated with the reciprocating engine liner 14 is illustrated by two sets of double headed axially directed arrows within the ID of the cylindrical engine housing 12.

The reciprocating engines 11, 11' may be used, for example, in a motor scooter, an automobile, a motorcycle, and a truck, but are not limited thereto.

Specifically, in regard to the first reciprocating cylinder seal assembly 10, FIG. 5 illustrates that each of the two reciprocating cylinder seal assemblies 10 has a metal, preferably steel, U-shaped retainer 18 that is of a unitary, one piece, construction that comprises an outer member 25, an inner member 27, and a connecting member 29. As further detailed in FIG. 5, the outer member 25 has an axial surface 31, the inner member 27 has an axial surface 33, and the connecting member 29 has a radial surface 35. The U-shaped retainer 18 is disposed on an elastomeric seal 20 between inner member surface 33 and seal surface 26.

The elastomeric seal 20 has an oil lip 22 and a gas lip 24, where a shape of the seal 20, in an area 41 between the lips 22, 24, is in a form of a curved arc inwardly extending into the seal 20. As seen in FIG. 5, the shape of the seal 20, from the oil lip 22 to the axial right side of the seal 20, is in a form of a truncated trapezoid, where the axial right side of the elastomeric seal 20 is coplanar with a tapered edge 39 of the U-shaped retainer 18. The oil lip 22 is shown flatten somewhat into the liner 14, while the gas lip 24 is shown in glancing contact with the liner 14. As further seen in FIG. 5, the gas lip 24 axially extends away from the area 41 between the lips 22, 24 of the elastomeric seal 20.

Figure 3:
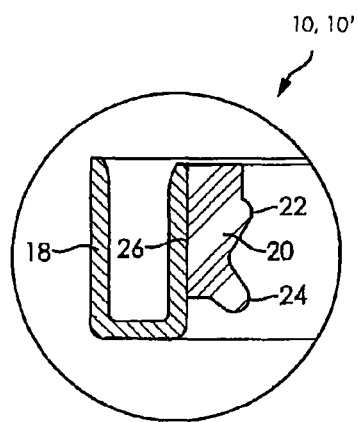
FIG. 3 is a cross sectional inset view of circled area 3 of FIG. 2.

The inner member 27 of the U-shaped retainer 18 is shown parallel to and extends axially away from the connecting member 29, as seen in FIG. 5, and is shorter than the length of the outer member 25 of the U-shaped retainer 18, which is also seen extending axially away from the connecting member 29. The connecting member 29 of the U-shaped retainer 18 is essentially perpendicular to both the inner member 27 and the outer member 25 of the U-shaped retainer 18. As shown in FIG. 3, the three members 25, 27, 29 may essentially have an equivalent thickness. It is possible, however, that these members 25, 27, 29 may vary in thickness, as FIG. 5 shows member 27 being slightly thicker than the other two members 25, 29 of the U-shaped retainer 18. Each of the outer and the inner members 25, 27 of the U-shaped retainer 18 has a tapered end as shown in FIG. 5. The tapered end 39 of the U-shaped retainer 18 may be co-planar and flush with the radial edge of the elastomeric surface 26.

When installed in the reciprocating engine 11, the assembly of the elastomeric seal 20 and the U-shaped retainer 18 is pressed into the ID of the cylindrical engine housing 12, as shown in FIG. 5, wherein the U-shaped retainer 18 is in intimate direct contact with the axial surfaces 32, 34 of the cylindrical engine housing 12. Further, the oil lip 22 and gas lip 24 make the sliding elastomeric-to-metal sealing contact with the reciprocating engine liner 14. Also, the radial surface 35 of the connecting member 29 is in intimate direct contact with, and is parallel to, the corresponding radial surface 34 of the cylindrical engine housing 12.

The first reciprocating cylinder seal assembly 10 is different than that utilized with conventional engine reciprocating cylinder seal assemblies having a retainer fitted around a valve guide, which is mentioned in the Background of the Device section above. This difference is due to the U-shaped retainer 18, with the elastomeric seal 20 attached, being pressed into intimate direct contact between the cylindrical engine housing 12. This intimate direct contact occurring at the axial outward engine housing surface 32 and axial outward U-shaped retainer surface 31 and at radial outward engine housing surface 34/radial outward U-shaped retainer surface 35.

Regarding run out, motion associated with run out of the reciprocating engine liner 14 is depicted in FIG. 4 by the two sets of double headed radially directed arrows that are illustrated therein. It has been found that the first reciprocating cylinder seal assembly 10 addresses the concerns of engine reciprocating engine manufacturers who require a design that is capable of withstanding large run out (see Table below). This is especially true for sealing the large diameter cylinder reciprocating engine liner 14.

Hence, it is a discovery to press the surface 31 and/or the surface 35 of the U-shaped retainer 18 into intimate contact with the surface 32 and/or the surface 34 of the cylinder wall 50 of the engine housing 12. Thereby, in conjunction with the lips 22, 24, this results in better utilization of oil and better containment of exhaust gasses (i.e., potential pollutants) is realized. Also, the U-shaped retainer 18 bends and flexes, thereby providing eccentricity tolerance of the radial movement of the reciprocating liner 14. Consequently, the U-shaped retainer absorbs a portion of the radial component of the energy produced by the large diameter cylinder reciprocating engine liner 14. This results in better control of run out than that experienced with conventional reciprocating cylinder liner seal assemblies.

For the reciprocating engine 11 of the present invention, pressurized oil is present on the side of the oil lip 22 that is axially to the right (as seen in FIG. 5) of the seal 20, and unrestricted manifold gas G pressure (see manifold M in FIG. 5) is present on the left side of the gas lip 24. The above described arrangement of the reciprocating cylinder seal assembly 10 and elastomeric seal 20 is further different from a valve seal stem application, wherein the oil side of its seal is exposed to oil splashing, but not full fluidized oil pressure.

Hence, the engine reciprocating cylinder liner seal assembly 10 results in better control of radial run out associated with its reciprocating mechanisms, thereby better containing oil and exhaust gasses with its valve seals over an engine's lifetime. Such a reciprocating cylinder liner engine operates better, produces less pollutants, and experiences an extended life span.

Specifically, in regard to the second reciprocating cylinder seal assembly 10', FIG. 7 illustrates that each of the two reciprocating cylinder seal assemblies 10' has a metal, preferably steel, U-shaped retainer 18 that is the same as that disclosed for the first reciprocating cylinder seal assembly 10. This includes the outer member 25 having the axial surface 31, the inner member 27 having the axial surface 33, and the connecting member 29 having the radial surface 35, which is shown in FIG. 5. Also, the U-shaped retainer 18 is disposed on the elastomeric seal 20 between the inner member surface 33 and the seal surface 26, as is the case for the first reciprocating cylinder seal assembly 10.

When installed in the reciprocating engine 11', the assembly of the elastomeric seal 20 and the U-shaped retainer 18 is pressed into the ID of the cylindrical engine housing 12, as shown in FIG. 7, wherein the U-shaped retainer 18 is in intimate direct contact with the axial surface 32 of the cylindrical engine housing 12, much like that shown in FIG. 5. Further, the oil lip 22 and gas lip 24 make the sliding elastomeric-to-metal sealing contact with the reciprocating engine liner 14. In contrast to FIG. 5, however, the radial surface 35 of the connecting member 29 is not in intimate direct contact with the corresponding radial surface 34 of the cylindrical engine housing 12. Instead, in the second reciprocating cylinder seal assembly 10', FIG. 7 illustrates that the radial surface 35 of the connecting member 29 is separated from the corresponding radial surface 34 of the cylindrical engine housing 12 by a J-shaped gas shield 42. Therefore, the radial surface 34 of the cylindrical engine housing 12 and the radial surface 35 of the connecting member 29 are instead in contact with a major portion 47 of a J-shaped gas shield 42.

The second reciprocating cylinder seal assembly 10' is different than that utilized with conventional engine reciprocating cylinder seal assemblies having a retainer fitted around a valve guide, which is mentioned in the Background of the Device section above. This difference is due to the U-shaped retainer 18, with the elastomeric seal 20 attached, being pressed into intimate direct contact between the cylindrical engine housing 12. This intimate direct contact occurring at the axial outward engine housing surface 32 and axial outward U-shaped retainer surface 31. Also, the radial outward engine housing surface 34 and the radial outward U-shaped retainer surface 35 are in contact with the J-shaped shield 42 that separates the two surfaces 34 and 35, as shown in FIG. 7. The shield 42 may comprise carbon.

Regarding run out, motion associated with run out of the reciprocating engine liner 14 is depicted in FIG. 6 by the two sets of double headed radially directed arrows that are illustrated therein. It has been found that the second reciprocating cylinder seal assembly 10' addresses the concerns of vehicle reciprocating engine manufacturers who require a design that is capable of withstanding large run out (see Table below). This is especially true for sealing the large diameter cylinder reciprocating engine liner 14.

Hence, it is a discovery of the present invention to press the surface 31 of the U-shaped retainer 18 into intimate contact with the surface 32 of the cylinder wall 50 of the engine housing 12. Thereby, in conjunction with the lips 22, 24, this results in better utilization of oil and better containment of exhaust gasses (i.e., potential pollutants) is realized. As in the case of the first reciprocating cylinder seal assembly 10, the U-shaped retainer 18 of the second reciprocating cylinder seal assembly 10' bends and flexes, thereby providing eccentricity tolerance of the radial movement of the reciprocating liner 14. Consequently, the U-shaped retainer absorbs a portion of the radial component of the energy produced by the large diameter cylinder reciprocating engine liner 14. This results in better control of run out than that experienced with conventional reciprocating cylinder liner seal assemblies.

For the reciprocating engine 11' of the present invention, pressurized oil is present on the side of the oil lip 22 that is axially to the right (as seen in FIG. 7) of the seal 20, and unrestricted manifold gas G pressure (see manifold M in FIG. 7) is present on the left side of the gas lip 24. The above described arrangement of the reciprocating cylinder seal assembly 10 and elastomeric seal 20 is further different from a valve seal stem application, wherein the oil side of its seal is exposed to oil splashing, but not full fluidized oil.

As mention above, the major portion 47 of the J-shaped gas shield is located between the U-shaped valve seal retainer and a vehicle reciprocating engine housing. A hook portion 49 of the J-shaped gas shield 42, however, is located between the gas sealing lip 24 and a manifold port M, wherein the major portion 47 and the hook portion 49 are one piece, unitary, and equally formed. The hook portion 49 of the J-shaped gas shield 42 has a backer ring 44 embedded therein. The J-shaped gas shield comprises PTFE and the backer ring 44 comprises metal, wherein the metal backer ring 44 cooperates with the PTFE gas shield to better prevent the gas shield 42 from expanding away from the reciprocating engine housing 12. Thereby, the gas shield 42 better prevents manifold port gas G from weaken the elastomeric seal 20 to leak oil.

To summarize, the elastomeric seal 20 has a radially inwardly directed oil sealing lip 22 and the radially inwardly directed gas sealing lip 24, which are in contact with the reciprocating engine liner 14. The U-shaped seal retainer 18 is axially disposed upon the radially outward surface 26 of the elastomeric seal 20, and the major portion 47 of the J-shaped gas shield 42 is located between the U-shaped valve seal retainer 18 and the reciprocating engine housing 12, the hook portion 49 of the J-shaped gas shield 42 is located between the oil sealing lip 22 and a manifold port M, wherein the hook portion 49 of the J-shaped gas shield 42 has a metal backer ring 44 embedded therein.

Figure 8:
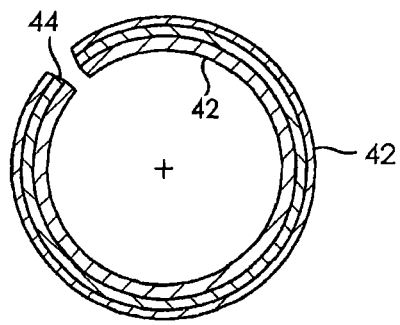
FIG. 8 is an axial view of the shield of FIG. 7.
Figure 9:
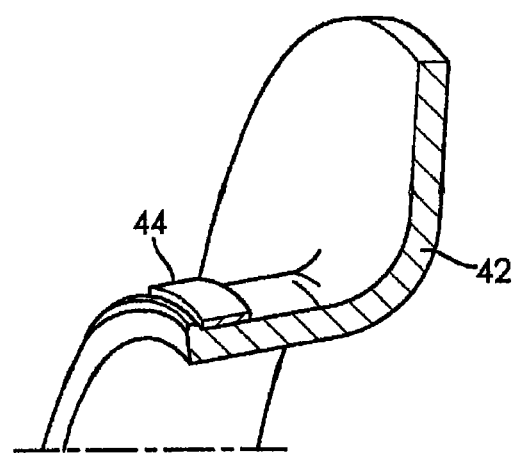
FIG. 9 is a cross sectional orthogonal view of the gas shield of FIG. 7.

In the embodiment of the reciprocating cylinder seal assemblies 10', the gas shield 42 not only provides a function as a seal but also a function as a gas barrier. The gas shield 42 is installed in a fashion that generates hoop tension, maintaining contact with the cylinder sleeve wall 50, which is shown in FIG. 7. As the gas shield 42 is held stationary, this results in a scraping affect as the piston liner 14 reciprocates. The scraper seal shield 42 provides a gas barrier much like a labyrinth seal (not shown) would. Hence, the gas shield 42 functions as an effective gas barrier. FIG. 8 shows an axial view of the gas shield 42 and FIG. 9 shows a cross sectional orthogonal view of the gas shield 42 with the metal backer ring 44. It has been found that the metal backer ring 44 helps to keep the hook portion 49 from opening under varying thermal expansion and contraction conditions of the gas shield 42. Thereby, the reliability of the the gas lip 24 is assured by blocking very high gas pressure from being exerted on the gas lip 24 by manifold gases G.

TABLE

| Expected max run out tolerances of liner 14: | |
|---|---|
| 1. Tipping due to running clearance + thermal growth = | 0.05 mm |
| 2. Axis offset due to glide circularity and run out tols. = | 0.025 mm |
| 3. Axis offset due to block core run out tols. = | 0.06 mm |
| 4. Valve roundness = | 0.015 mm |
| Total = | 0.150 mm |

In accordance with the provisions of the patent statutes, the principles and modes of operation of this device have been described and illustrated in its preferred embodiments. However, it must be understood that the device may be practiced otherwise than specifically explained and illustrated without departing from its spirit or scope.

What is claimed is:

1. A reciprocating cylinder seal assembly, comprising:
   an elastomeric seal with a radially inwardly directed oil sealing lip and a radially inwardly directed gas sealing lip, wherein both lips are in elastomeric-to-metal sealing contact with a reciprocating engine liner; and
   a U-shaped seal retainer disposed on the elastomeric seal, wherein the U-shaped seal retainer is in direct intimate contact with a cylindrical engine housing;
   wherein the U-shaped seal retainer comprises steel and is of a unitary, one-piece construction.

2. The reciprocating cylinder seal assembly of claim 1, wherein the reciprocating engine liner is in sliding contact with the cylindrical engine housing, at an inside diameter ID of the cylindrical engine housing.

3. The reciprocating cylinder seal assembly of claim 1, wherein pressurized oil is present on a side of the oil lip that is axially away from the gas lip, and unrestricted manifold pressure is present on a side of the gas lip away from the oil lip.

4. The reciprocating cylinder seal assembly of claim 1, wherein the U-shaped retainer comprises an inner member, an outer member, and a connecting member.

5. The reciprocating cylinder seal assembly of claim 4, wherein the U-shaped retainer is disposed on a portion of the elastomeric seal, by way of the inner member.

6. The reciprocating cylinder seal assembly of claim 4, wherein the inner member is parallel to and slightly shorter than the length of the outer member, the connecting member is essentially perpendicular to both the inner member and the outer member, and all three members have an equivalent thickness;
   wherein each of the inner and the outer members has a tapered end, and a tapered edge of the U-shaped retainer is co-planar and flush with the radial edge of an upper elastomeric surface.

7. The reciprocating cylinder seal assembly of claim 1, wherein the elastomeric seal is structured with a curved arc gap between the oil sealing lip and the gas sealing lip, and the elastomeric seal is further structured with a truncated trapezoidal gap from the oil sealing lip to the right axial end of the elastomeric seal.

8. The reciprocating cylinder seal assembly of claim 1, wherein the U-shaped retainer with the elastomeric seal attached, is pressed into intimate direct contact with the cylindrical engine housing, at the surface.

9. The reciprocating cylinder seal assembly of claim 8, wherein the direct intimate contact between the U-shaped seal retainer and the cylindrical engine housing is further made with a connecting member of the U-shaped seal retainer.

10. The reciprocating cylinder seal assembly of claim 1, wherein the U-shaped retainer provides eccentricity tolerance of the radial movement of the reciprocating liner, so as to absorb a portion of the radial component of the energy produced by the cylinder reciprocating engine liner and to contain exhaust gasses.

11. The reciprocating cylinder seal assembly of claim 1, wherein the U-shaped seal retainer, in conjunction with the lips contain exhaust gasses and are eccentricity tolerant of the radial movement of the reciprocating engine liner, so as to control run out of the reciprocating engine.

12. The reciprocating cylinder seal assembly of claim 1, wherein maximum run out of the liner is in the order of 0.150 mm from 0.05 mm tipping due to running clearance plus thermal growth, plus 0.025 mm axis offset due to glide circularity and run out tolerances, plus 0.06 mm due to axis offset due to block core run out tolerances, plus 0.015 mm due to valve roundness.

13. A reciprocating cylinder seal assembly comprising:
an elastomeric seal having a radially inwardly directed oil sealing lip and a radially inwardly directed gas sealing lip in contact with a reciprocating engine liner;
a U-shaped seal retainer axially disposed upon a radially outward surface of the elastomeric seal; and
a major portion of a J-shaped gas shield located between the U-shaped valve seal retainer and an engine reciprocating engine housing, a hook portion of the J-shaped gas shield is located between the oil sealing lip and a manifold port;
wherein the hook portion of the J-shaped gas shield has a metal backer ring embedded therein;
wherein the U-shaped seal retainer comprises steel and is of a unitary, one-piece construction.

* * * * *